United States Patent
Nykänen et al.

(10) Patent No.: US 6,714,778 B2
(45) Date of Patent: Mar. 30, 2004

(54) CONTEXT SENSITIVE WEB SERVICES

(75) Inventors: Petri Nykänen, Nokia (FI); Jari Paloniemi, Kiiminki (FI); Petri Kangas, Oulu (FI)

(73) Assignee: Nokia Corporation, Espoo (FI)

( * ) Notice: Subject to any disclaimer, the term of this patent is extended or adjusted under 35 U.S.C. 154(b) by 14 days.

(21) Appl. No.: 09/854,628

(22) Filed: May 15, 2001

(65) Prior Publication Data

US 2002/0173295 A1 Nov. 21, 2002

(51) Int. Cl.[7] .............................................. H04M 3/42
(52) U.S. Cl. ..................... 455/414.1; 455/410; 709/223
(58) Field of Search ............................... 455/3.03, 402, 455/405, 410–411, 412.1–420, 459, 466, 550.1, 515, 556.2, 575.1; 709/105, 226, 223

(56) References Cited

U.S. PATENT DOCUMENTS

| | | | |
|---|---|---|---|
| 5,555,446 A | * 9/1996 | Jasinski | 340/7.21 |
| 5,758,332 A | * 5/1998 | Hirotani | 707/1 |
| 6,061,570 A | * 5/2000 | Janow | 340/7.29 |
| 6,073,075 A | 6/2000 | Kondo et al. | |
| 6,088,730 A | * 7/2000 | Kato et al. | 455/556 |
| 6,115,611 A | * 9/2000 | Kimoto et al. | 455/422 |
| 6,353,888 B1 | * 3/2002 | Kakehi et al. | 713/168 |
| 6,401,085 B1 | * 6/2002 | Gershman et al. | 707/4 |
| 6,405,033 B1 | * 6/2002 | Kennedy et al. | 455/414 |
| 6,446,069 B1 | * 9/2002 | Yaung et al. | 707/9 |
| 6,490,443 B1 | * 12/2002 | Freeny, Jr. | 455/406 |

FOREIGN PATENT DOCUMENTS

GB 2 349 551 * 11/2000 ................ 455/414

* cited by examiner

Primary Examiner—Edward F. Urban
Assistant Examiner—Simon Nguyen
(74) Attorney, Agent, or Firm—Morgan & Finnegan, LLP; Joseph C. Redmond, Jr.

(57) ABSTRACT

The context sensitive web services method enables a mobile phone or wireless device to use context inference techniques to sense the user's environment and in response, to provide useful information to the user that is appropriate to the user's perceived environment. The method includes the steps of receiving sensor signals characterizing a current environment of the wireless device; processing the sensor signals with a context inference engine; outputting a current context result from the processing by context inference engine; and providing useful information to the user in response to the current context result. A further aspect of the method provides user control of access by application programs to the user's private data, including private data in a server. Still further, this can also include providing user control of access by application programs in a web server, to the user's private data. Another aspect of the method is providing the current context result to an application program in response to the user control and receiving the useful information from the application program. The invention enables the user to grant access permission to the application program to access the current context result. This can be performed in the user's wireless device or in the network server. The network server can carry out the control of access by application programs in web servers, in response to a user privacy profile received from the user's wireless device.

51 Claims, 7 Drawing Sheets

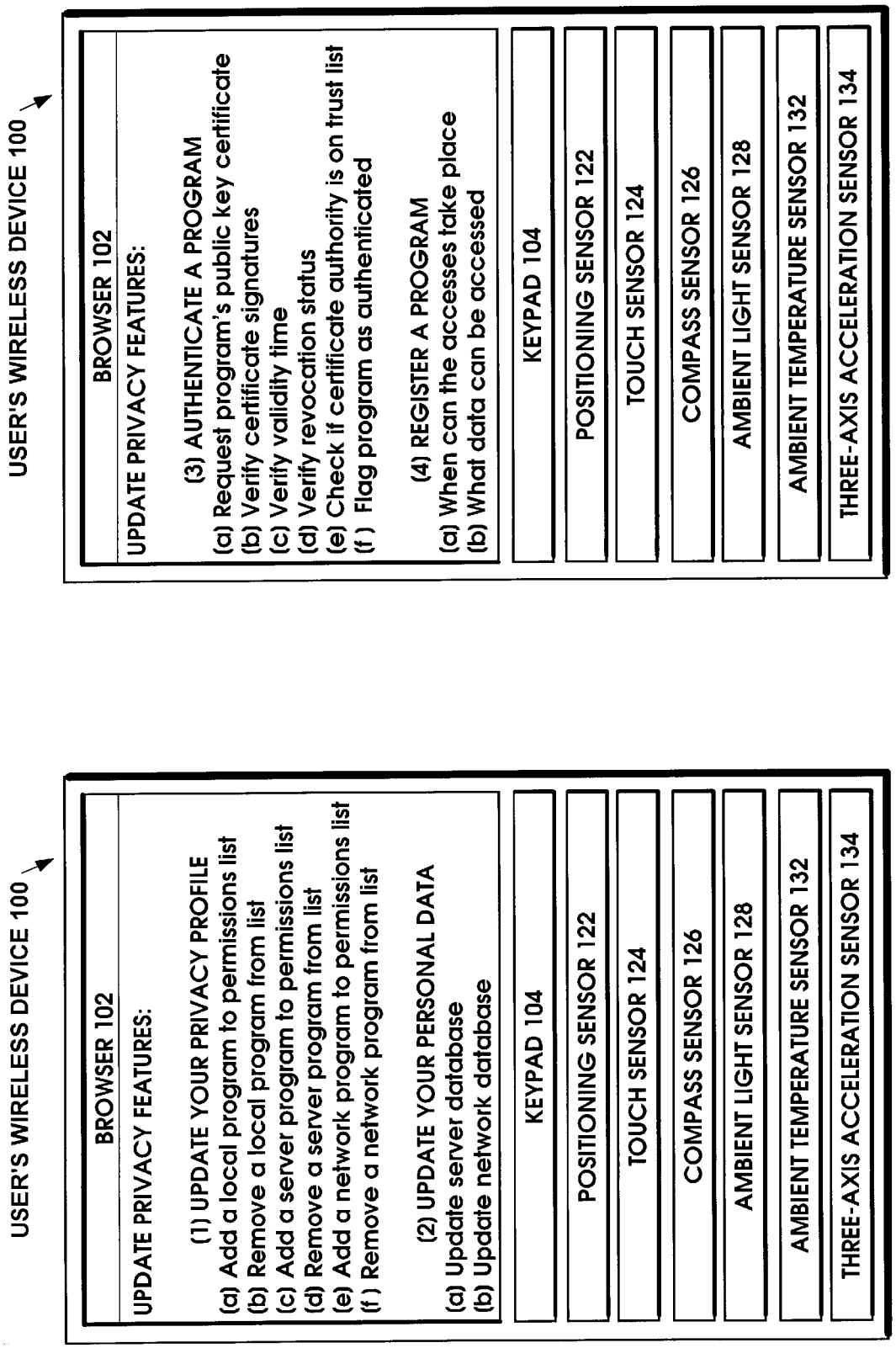

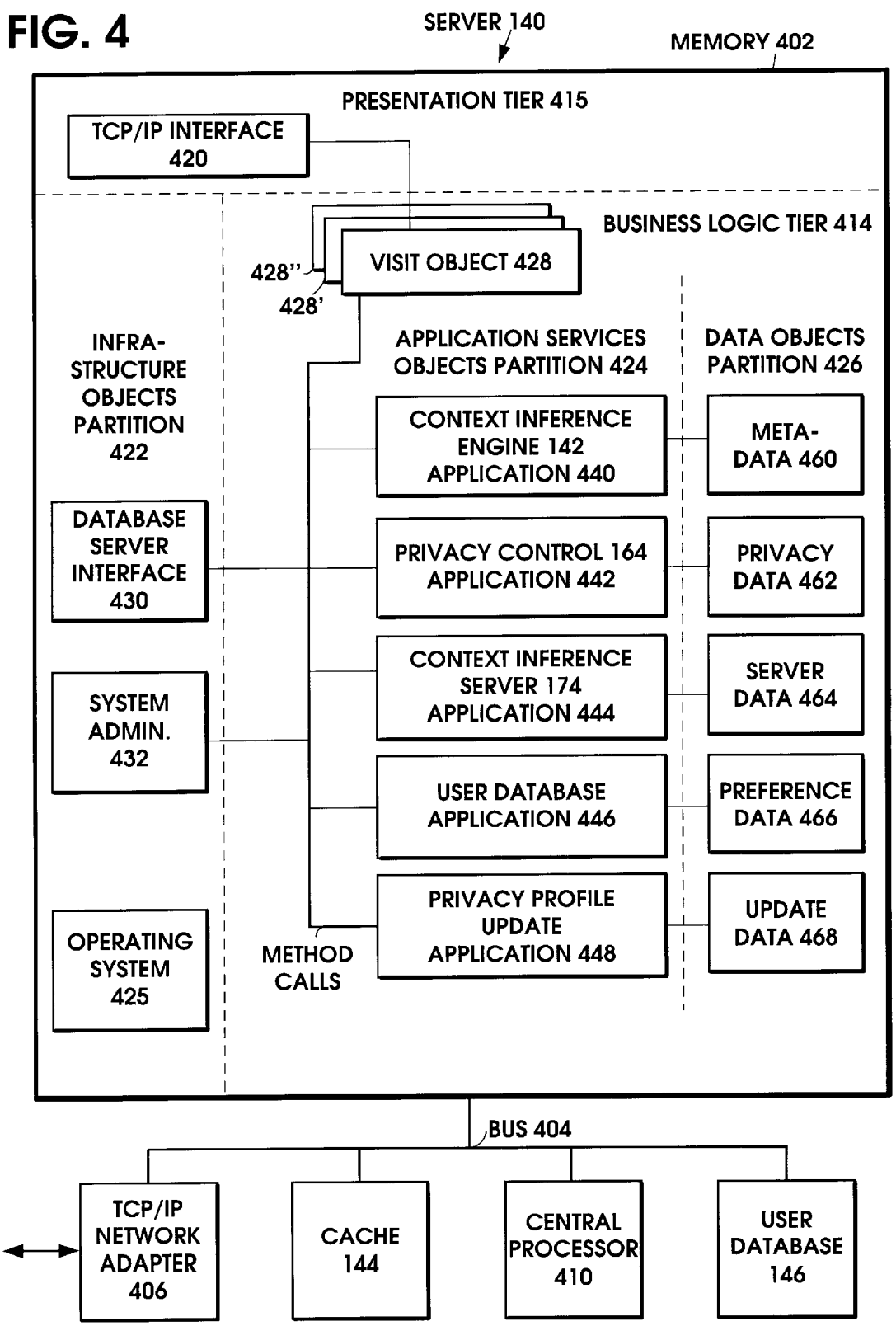

CONTEXT SENSITIVE WEB SERVICES

BACKGROUND OF THE INVENTION

1. Field of the Invention

The invention disclosed broadly relates to methods for providing Internet services and more particularly relates to improvements in mobile device accessing of Internet services.

2. Background Art

Mobile phones and wireless personal digital assistants (PDAs) are able to access the Internet using the Wireless Application Protocol (WAP). WAP-enabled wireless devices can now access Internet applications such as headline news, exchange rates, sports results, stock quotes, weather forecasts, multilingual phrase dictionaries, personal online calendars, online travel and banking services, or download distinctive ringing tones. Broadband wireless networks make it possible for WAP-enabled wireless devices to exchange multimedia messages that combine conventional text with much richer content types, such as photographs, images, voice clips, and video clips. WAP-enabled wireless devices can be used to pay bills online using the wireless device as a virtual wallet. WAP-enabled wireless devices can deliver useful and informative advertising and transaction services from online merchants. WAP-enabled wireless devices now also provide entertainment services, such as interactive adventure games, quizzes, and chess tournaments.

What is needed is the ability of a mobile phone or wireless PDA to use context inference techniques to sense the mobile user's environment and in response, to provide useful information to the user that is appropriate to the user's perceived environment. It would be even more useful to offload some of the computationally intensive computing necessary in context inference techniques, from the mobile user's wireless device to a server and to web sites on the Internet. It would be beneficial to maintain a personal profile of the mobile user's personal preferences in an online server or web site. It would be important to provide the mobile user with the ability to control any access to the user's profile by the online server or web site.

SUMMARY OF THE INVENTION

The context sensitive web services invention enables a mobile phone or wireless PDA to use context inference techniques to sense the user's environment and in response, to provide useful information to the user that is appropriate to the user's perceived environment.

One aspect of the invention is a method to enable a wireless device to provide useful information to its user that is appropriate to the device's current environment. The method includes the steps of receiving sensor signals characterizing a current environment of the wireless device; processing the sensor signals with a context inference engine; outputting a current context result from the processing by context inference engine; and providing useful information to the user in response to the current context result. The processing of the sensor signals with a context inference engine is embodied as programmed instructions executed within the user's wireless device. In another aspect of the invention, the processing of the sensor signals with a context inference engine is embodied as programmed instructions executed within a separate network server in response to signals from the user's wireless device. The server can access files from a web server, for selective forwarding to the user's wireless device. A personal profile of the user can be maintained by the server.

A further aspect of the invention provides user control of access by application programs to the user's private data. This can also include providing user control of access by application programs to the user's private data in the server. Still further, this can also include providing user control of access by application programs in a web server, to the user's private data.

Another aspect of the invention is providing the current context result to an application program in response to the user control and receiving the useful information from the application program. The invention enables the user to grant access permission to the application program to access the current context result. This can be performed in the user's wireless device or in the network server. The network server can carry out the control of access by application programs in web servers, in response to a user privacy profile received from the user's wireless device.

DESCRIPTION OF THE FIGURES

FIG. 1A shows the user's wireless device with the UPDATE PRIVACY FEATURES: sub-menu of the Context Sensitive Services menu, enabling the user to UPDATE YOUR PRIVACY PROFILE or UPDATE YOUR PERSONAL DATA.

FIG. 1B shows the user's wireless device with the UPDATE PRIVACY FEATURES: sub-menu of the Context Sensitive Services menu, enabling the user to AUTHENTICATE A PROGRAM and REGISTER A PROGRAM.

FIG. 4 is a functional block diagram of the network server 140, showing the memory storing the application services software programs needed to perform the operations of the invention.

DISCUSSION OF THE PREFERRED EMBODIMENT

The context sensitive web services invention enables a mobile phone or wireless PDA to use context inference techniques to sense the user's environment and in response, to provide useful information to the user that is appropriate to the user's perceived environment. The invention offloads some of the computationally intensive computing necessary in context inference techniques, from the mobile user's wireless device to a server and to web sites on the Internet. The context sensitive web services invention maintains a personal profile of the mobile user's personal preferences in an online server or web site. The mobile user is provided with the ability to control access by application programs in the wireless device, to the user's private data. The context sensitive web services invention provide the mobile user with the ability to control any access to the user's profile by the online server or web site.

The mobile user's wireless device is equipped with a context inference engine for providing and awareness of the mobile user's context to application programs, including third party applications. Since the processing power and storage capacity is limited in typical wireless devices, the computational load and storage requirements of the context inference engine are distributed to a context inference server capable of processing the context data. The invention enables the mobile user to control which application programs in the wireless device are granted access to the user's private context information. A privacy control block in the wireless device grants or revokes access by application programs to the private context information, based on the mobile user's preferences stored in a privacy profile. The same privacy control and privacy profile is extended to the context inference server, thereby enabling the extension of the user's privacy control to any web server connected to the context inference server. The invention thus enables building an infrastructure for context sensitive applications and services within the wireless device and the server, while providing to the mobile user control over the privacy user's context information.

Figure 1:
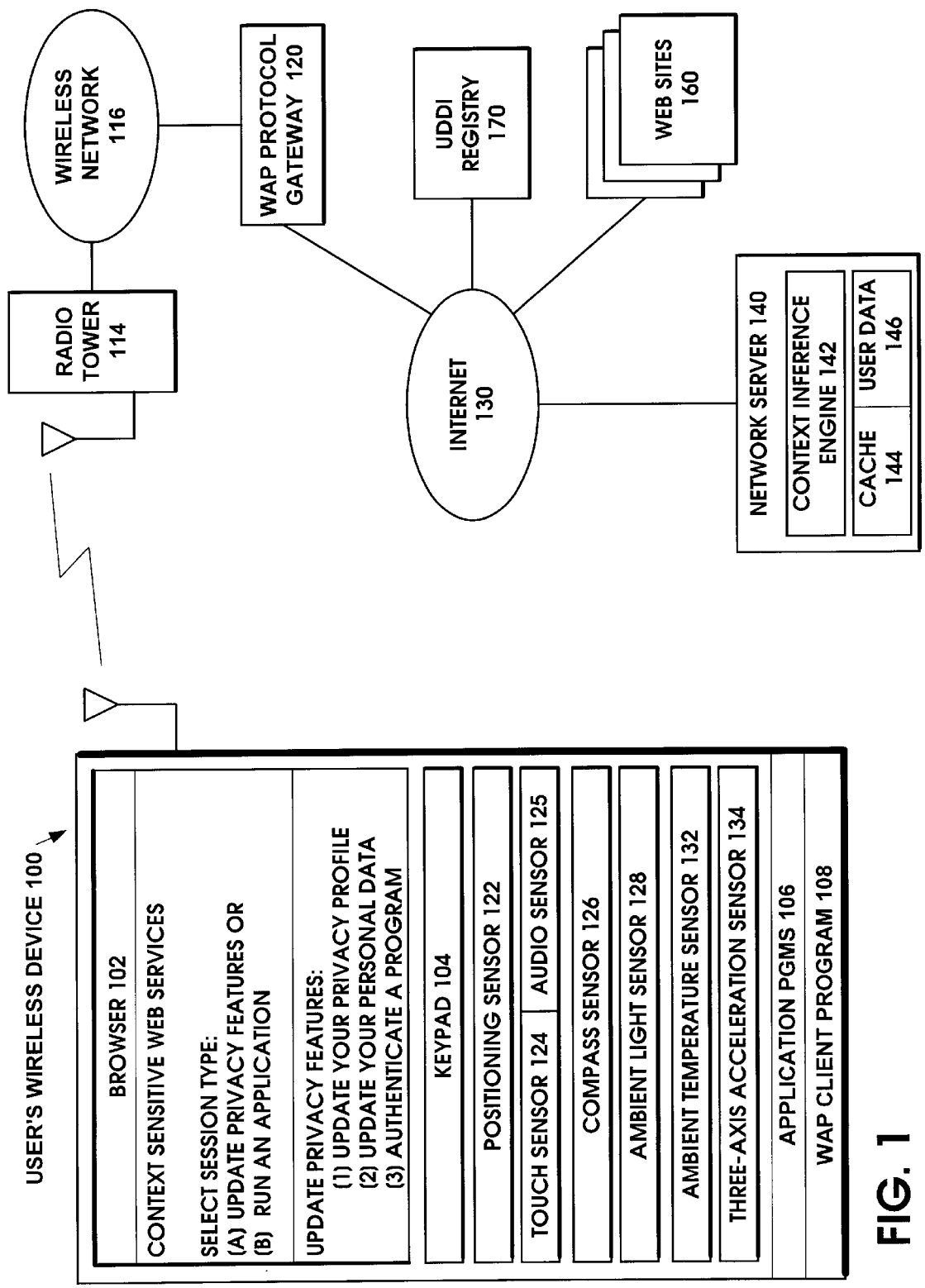
FIG. 1 is a network diagram of the invention, showing an example relationship between the user's Wireless Application Protocol (WAP)-enabled portable wireless device, the WAP protocol gateway to the Internet, the network server, the Universal Description, Discovery and Integration (UDDI) registry, and a plurality of web sites.

The invention is applied to wireless telephones and wireless personal digital assistants (PDAs) implementing the Wireless Application Protocol (WAP) standard. FIG. 1 is a network diagram of an embodiment of the invention, showing an example relationship between the user's Wireless Application Protocol (WAP)-enabled portable wireless device 100, a WAP protocol gateway 120, and the server 140. The user's WAP-enabled portable wireless device 100 can be a wireless mobile phone, pager, two-way radio, smartphone, personal communicator, or the like. The user's WAP-enabled portable wireless device 100 accesses a small file called a deck which is composed of several smaller pages called cards which are small enough to fit into the display area of the device's microbrowser 102. The small size of the microbrowser 102 and the small file sizes accommodate the low memory constraints of the portable wireless device 100 and the low-bandwidth constraints of a wireless network 116. The cards are written in the Wireless Markup Language (WML) which is specifically devised for small screens and one-hand navigation without a keyboard. The WML language is scaleable from two-line text displays on the microbrowser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages.

The Nokia WAP Client Version 2.0 is a software product containing the components necessary to implement the WAP client 108 on the wireless device 100. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 106 stored in the wireless device 100 interact with the WAP Client 108 to implement a variety of communications applications. Details of the Nokia WAP Client Version 2.0 can be found in the online paper: *Nokia WAP Client Version 2.0, Product Overview*, Nokia Internet Communications, 2000, www.nokia.com/corporate/wap.

The WAP Client 108 includes the Wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client 108, which includes security features, such as the public and private keys and service certificates, needed for user authentication and digital signatures. Additionally, it has the ability to perform cryptographic operations to encrypt and decrypt messages.

The wireless device 100 of FIG. 1 also has a plurality of sensors for sensing the mobile user's ambient conditions. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The audio sensor 125 can be a microphone, for example, which can detect speech or environmental sounds. The positioning sensor can be, for example, a GPS receiver integrated in the device. The positioning sensor can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". These sensors provide inputs which are sampled by the wireless device 100 to infer a current context, as will be described below.

The WAP protocol gateway 120 links the Internet 130 and the wireless network 116. The WAP protocol gateway 120 includes the Wireless Public Key infrastructure (PKI) feature to help provide a secure Internet connection to the wireless device 100. The WAP protocol gateway 120 enables the WAP-enabled wireless device 100 to access Internet applications such as headline news, exchange rates, sports results, stock quotes, online travel and banking services, or to download distinctive ringing tones.

The user's WAP-enabled portable wireless device 100 communicates with the radio tower 114 and can exchange messages for distances up to several kilometers. The types of wireless networks 116 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like.

The overall process of communication between the user's WAP-enabled wireless device (the client) 100, through the WAP protocol gateway 120, to the server 140 resembles the way Web pages are served on the Internet using the HyperText Transfer Protocol (HTTP) or World Wide Web protocol:

[1] The user presses a phone key on the user's device 100 related to the Uniform Resource Locator (URL) of the server 140.

[2] The user's device 100 sends the URL, via the radio tower 114 and the wireless network 116, to the gateway 120 using WAP protocols.

[3] The gateway 120 translates the WAP request into an HTTP request and sends it over the Internet 130 to the server 140, via Transmission Control Protocol/Internet Protocol (TCP/IP) interfaces.

[4] The server 140 handles the request just like any other HTTP request received over the Internet. The server 140 either returns a WML deck or a HyperText Markup Language (HTML) page back to the gateway 120 using standard server programs written, for example in Common Gateway Interface (CGI) programs, Java servlets, or the like.

[5] The gateway 120 receives the response from the server 140 on behalf of the user's device 100. If the response is an HTML page, it gets transcoded into WML if necessary. Then the WML and WMLScript coding is encoded into a byte code that is then sent to the user's device 100.

[6] The user's device 100 receives the response in the WML byte code and displays the first card in the deck on the microbrowser 102 to the user.

In FIG. 1, the protocol gateway 120 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, "Professional WAP", published by Wrox Press Ltd., 2000 (ISBN 1-861004-04-1).

In FIG. 1, the user's portable wireless device 100 includes the microbrowser 102 displays the Context Sensitive Services menu, to enable the user to navigate through the cards being displayed and to select options that are programmed by the application programs 106. The user's device 100 also includes the WAP client program 108 which has been previously discussed.

Figure 2:
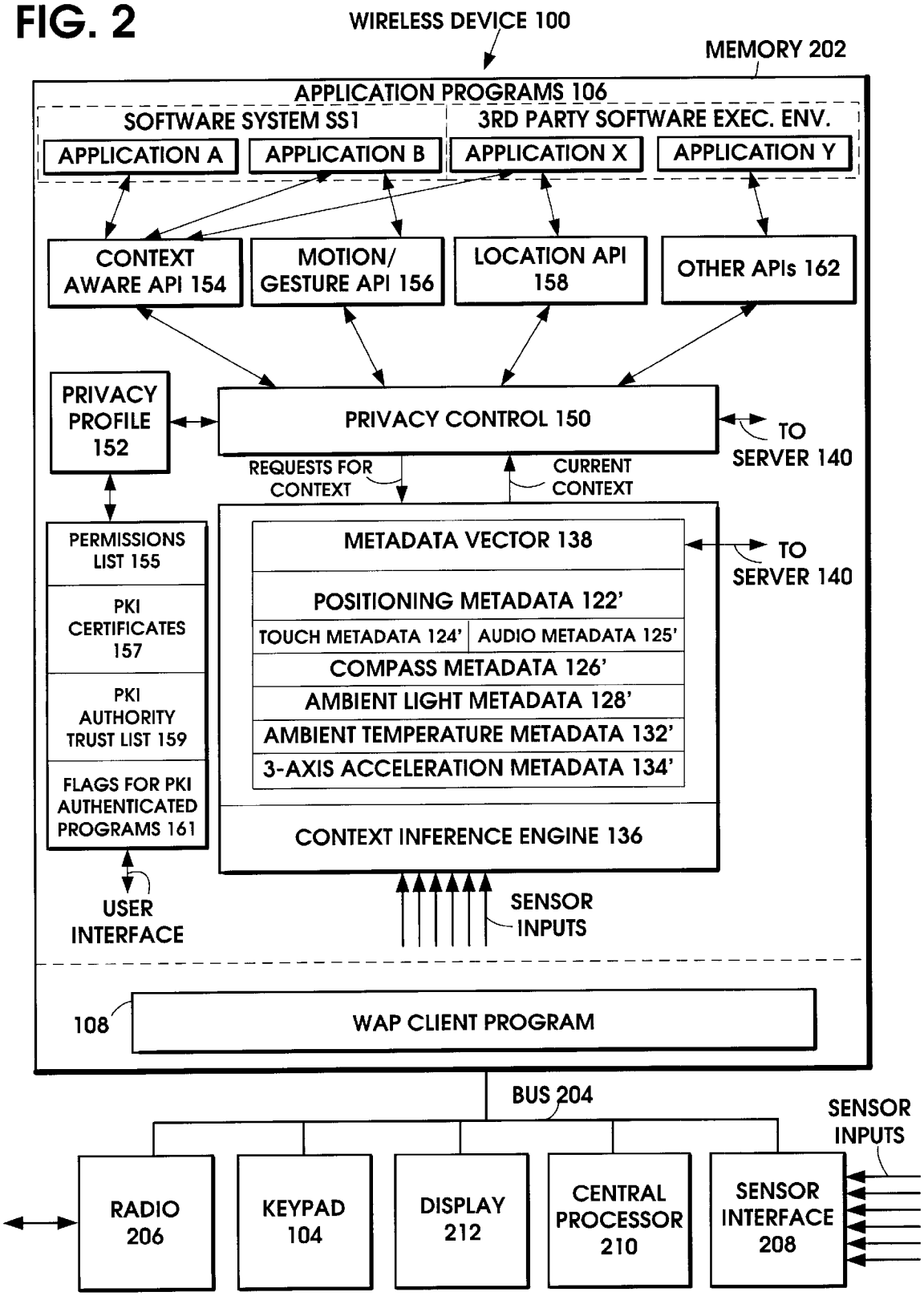
FIG. 2 is a functional block diagram of the wireless device 100, showing its various components and programs.
Figure 2A:
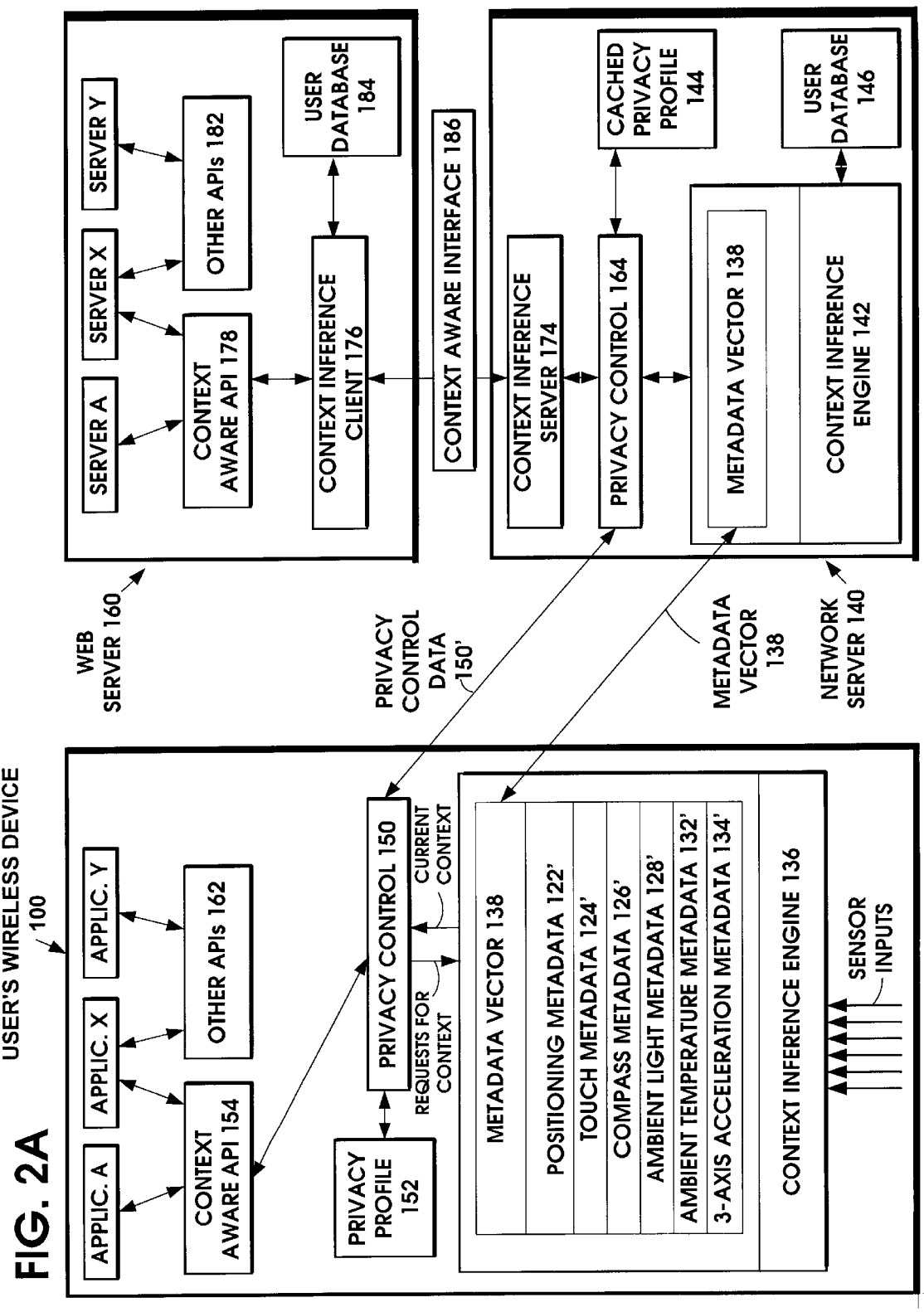
FIG. 2A is a functional block diagram of the wireless device 100, the server 140, and the web server 160, and their interaction when exchanging a metadata vector 138 and privacy control data 150.

The Context Sensitive Services menu displayed by the microbrowser 102 in FIG. 1 is rendered by the WAP client program 108 under the control of the application programs 106, which are shown in FIGS. 2 and 2A. The user can select the session type with Context Sensitive Services menu, either [A] UPDATE PRIVACY FEATURES or [B] RUN AN APPLICATION. If the UPDATE PRIVACY FEATURES session type is selected by the user, the Context Sensitive Services menu of FIG. 1 then presents to the user the UPDATE PRIVACY FEATURES sub-menu from which the user can select the following options:

[A] UPDATE PRIVACY FEATURES:

[1] UPDATE YOUR PRIVACY PROFILE

[2] UPDATE YOUR PERSONAL DATA

[3] AUTHENTICATE A PROGRAM

Option [1] of UPDATE YOUR PRIVACY PROFILE, leads to a second sub-menu shown in FIG. 1A, which has the following options:

[1] UPDATE YOUR PRIVACY PROFILE

[a] Add a local program to permissions list

[b] Remove a local program from list

[c] Add a server program to permissions list

[d] Remove a server program from list

[e] Add a network program to permissions list

[f] Remove a network program from list.

Option [2] of UPDATE YOUR PERSONAL DATA, leads to a another sub-menu shown in FIG. 1A, which has the following options:

[2] UPDATE YOUR PERSONAL DATA

[a] Update server database

[b] Update network database.

Option [3] of AUTHENTICATE A PROGRAM, leads to a another sub-menu shown in FIG. 1B, which has the following options:

[3] AUTHENTICATE A PROGRAM

[a] Request program's public key certificate

[b] Verify certificate signatures

[c] Verify validity time

[d] Verify revocation status

[e] Check if certificate authority on trust list

[f ] Flag program as authenticated.

The AUTHENTICATE A PROGRAM option calls the privacy control 150 of the wireless device 100 in FIG. 2. If an application program A, B, X, or Y has been verified for its acceptability by a trusted authority, then the trusted authority will have issued a digital certificate on a message authentication code (MAC) it has computed for the application program, which can be checked by the privacy control 150. As long as the privacy control 150 trusts the trusted authority issuing the digital certificate, authentication of the application program is straight forward.

Once the mobile user has verified the program's digital certificate and is satisfied that the application program will not subvert the integrity or security of the user's private data, the user can register the program. Registration is the granting by the user of access permission to the program, to access the current context of the user's wireless device and/or to access other portions of the user's private data. There are several levels of permission that can be granted by the user in two categories, [a] when can the accesses take place and [b] what data can be accessed.

Option [4] of REGISTER A PROGRAM, leads to a another sub-menu shown in FIG. 1B, which has the following options:

[4] REGISTER A PROGRAM

[a] When can the accesses take place

[b] What data can be accessed

For the first category of [a] when can the accesses take place, the highest level of permission in this category is that access can occur anytime and without notice. The lowest level of permission in this category is that access can only occur at specified times or under specified conditions, and only after notice to the user and specific authorization by the user. For the second category of [b] what data can be accessed, the highest level of permission in this category is to access unlimited datasets in the user's private data, including current context information, personal data entered by the user, the user's Internet usage history data, the user's Internet cookie data, and the user's application program usage data. The lowest level of permission in this category is that access of any data can only occur after notice to the user and specific authorization by the user. The user can configure any levels of permission in between the highest and lowest and make that the basis for the registration. The user can include the terms of registration in a digital certificate signed by the user and appended to the application program. This registration certificate can be presented by the program to the privacy control 150 prior to a proposed access event, the privacy control 150 to automatically verify the registration status of the program. The registration certificate can be constructed as follows.

The privacy control 150 can compute a message authentication code (MAC) and its own digital signature and append it as a certificate to an acceptable application program A, B, X, or Y. The privacy control 150 can include the terms of registration in the digital certificate. Then when the program requests access to the user's private data, the privacy control 150 can automatically check the MAC and its own digital signature to verify that the program has not been changed and the privacy control 150 can also automatically verify the registration status of the program. This is achieved by the privacy control 150 computing a hash value for the entire application program A, B, X, or Y (or some portion of it) and the terms of registration, and then forming a message authentication code (MAC) from the hash value. The privacy control 150 then uses its PKI private key to digitally sign the message authentication code (MAC). The terms of the registration, the MAC and the privacy control's digital signature are appended to the application program A, B, X, or Y as a registration certificate.

Then, whenever the application program A, B, X, or Y requests access to the user's context data or private data, the privacy control 150 will require the application program to present the registration certificate so that the privacy control 150 can check that the presented MAC compares with a computed MAC and that the presented digital signature is genuine. The privacy control 150 can then automatically grant access permission to the application program, in accordance with the terms of the registration.

Methods to generate and evaluate message authentication codes to insure the integrity of data are described in the book by Stephen Thomas entitled "SSL and TLS", published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled "Applied Cryptography—2nd Edition" published by John Wiley and Sons, 1996. Methods to generate and evaluate digital signatures to insure the source of the digital program are described in the book by Richard E. Smith entitled "Internet Cryptography", published by Addison Wesley, 1997.

What has been described here for the privacy control 150 in the wireless device 100, is equally applicable to the privacy control 164 in the network server 140 of FIG. 2A. The privacy control 164 in the network server 140 can compute the message authentication code (MAC) and its own digital signature and append it, with the terms of the registration, as a registration certificate to an acceptable application program in the web server 160. Privacy control 164 has a cached copy 144 of the Privacy Profile 152 of the wireless device 100. This enables automatically processing the privacy check in the network Server 140 for access requests from web server 160. When the application program in the web server 160 requests access to the user's private data in the network server 140 or in the wireless device 100, the privacy control 164 in the network server 140 will require the application program in the web server 160 to present the registration certificate so that it can check the MAC and its own digital signature to verify that the application program has not been changed. The privacy control 164 can then automatically grant access permission to the application program in the web server 160, in accordance with the terms of the registration.

Figure 1D:
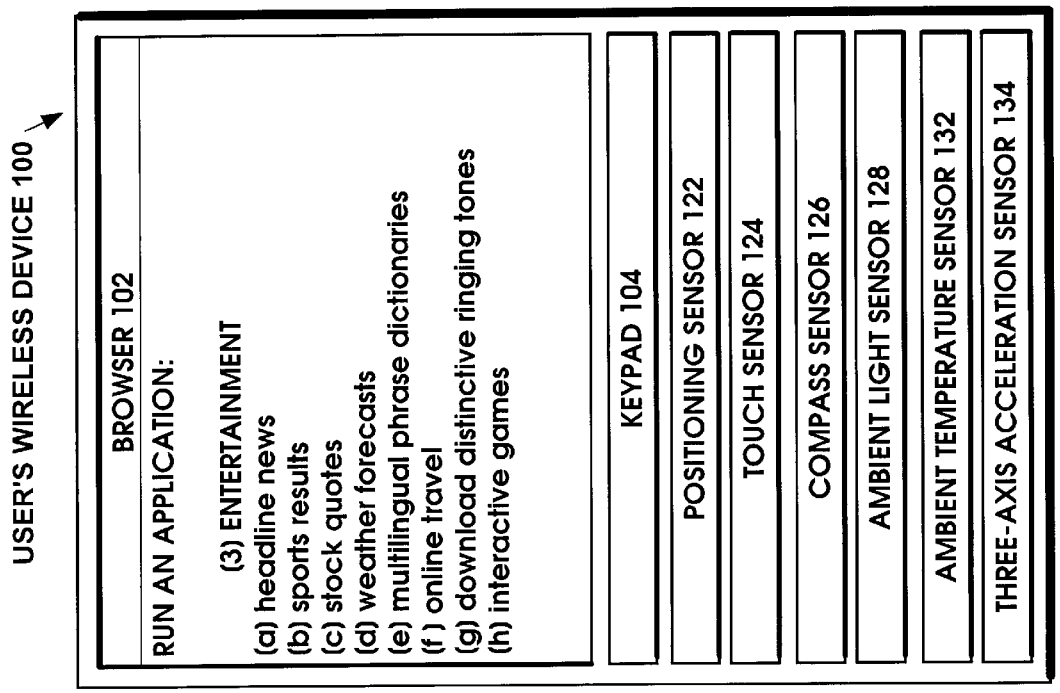
FIGS. 1C and 1D show the user's wireless device with the RUN AN APPLICATION sub-menu of the Context Sensitive Services menu, enabling the user to RUN AN APPLICATION.
Figure 1C:
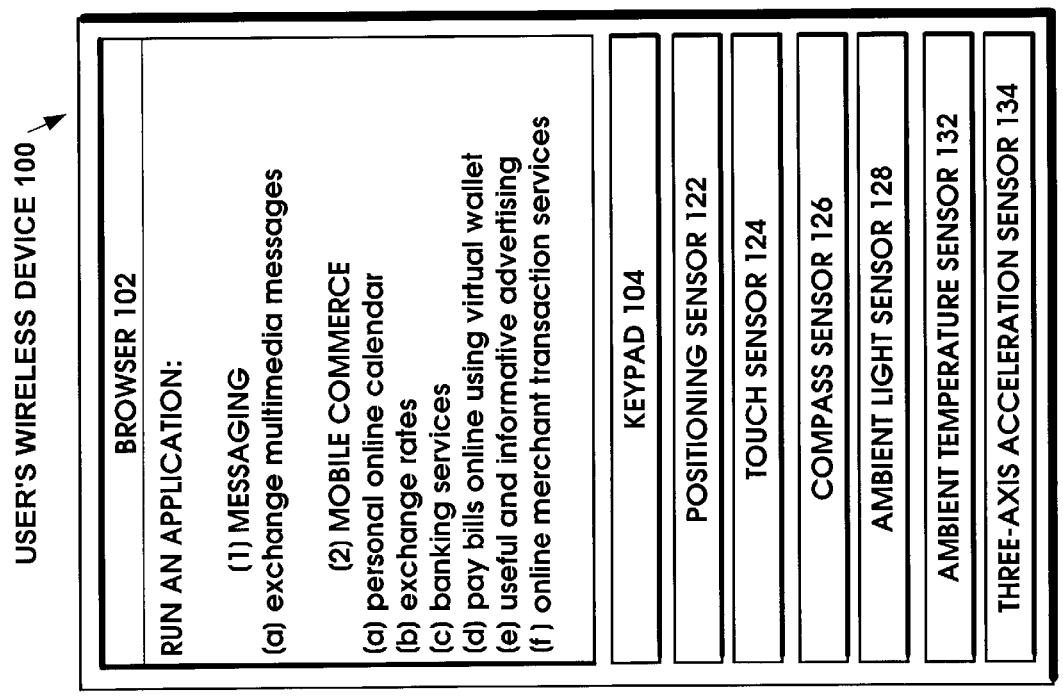

If the [B] RUN AN APPLICATION session type is selected by the user, the Context Sensitive Services menu of FIG. 1C then presents to the user the RUN AN APPLICATION sub-menu from which the user can select the following options:

[1] MESSAGING
 [a] exchange multimedia messages
[2] MOBILE COMMERCE
 [a] personal online calendar
 [b] exchange rates
 [c] banking services
 [d] pay bills online using virtual wallet
 [e] useful and informative advertising
 [f] online merchant transaction services The Context Sensitive Services menu of FIG. 1D presents to the user the RUN AN APPLICATION sub-menu from which the user can select the following options:

[3] ENTERTAINMENT
 [a] headline news
 [b] sports results
 [c] stock quotes
 [d] weather forecasts
 [e] multilingual phrase dictionaries
 [f] online travel
 [g] download distinctive ringing tones
 [h] interactive games The RUN AN APPLICATION option calls one of the application programs A, B, X, or Y of the wireless device 100 in FIG. 2.

FIG. 2 is a functional block diagram of the wireless device 100, showing its various components and programs. The wireless device 100 has context sensitive applications A, B, X, and Y, either downloaded, or in firmware. The wireless device 100 does not need to utilize external functionality in the network for the initial sampling and digitization of the sensor inputs. The sampled and digitized values of the sensor inputs are POSITIONING METADATA 122', TOUCH METADATA 124', AUDIO METADATA 125', COMPASS METADATA 126', AMBIENT LIGHT METADATA 128', AMBIENT TEMPERATURE METADATA 132', and THREE-AXIS ACCELERATION METADATA 134'. The sampled and digitized values of the sensor inputs are loaded into a metadata vector 138.

FIG. 2 shows the memory 202 of the wireless device 100, connected by the bus 204 to the keypad 104, the radio 206, the sensor interface 208, the central processor 210, and the display 212. The memory 202 stores programs which are sequences of executable instructions which, when executed by the processor 210, carry out the methods of the invention. The memory 202 stores the WAP client program 108, the context inference engine 136, the privacy control 150, the privacy profile 152, the context aware API 154, the motion/gesture API 156, the location API 158, and other APIs 162. The context inference engine 136 processes the metadata vector 138 to produce the current context. Application programs 106 stored in the memory 202 include the application programs A and B which are part of the software system SS1, and the application programs X and Y which are contained in the execution environment "Exec. Env."

If sufficient computational power and storage capacity are available in the wireless device 100, further processing of the metadata vector 138 can take place in the context inference engine 136, toward the objective of producing the result of an inferred current context. However, if at some point in the computation, the context inference engine 136 needs the processing power or storage capacity available at the network server 140, the metadata vector 138 is sent from the wireless device 100 to the context inference engine 142 in the network server 140 of FIG. 2A. The context inference engine 142 in the network server 140 can perform the required processing on the metadata vector 138 and then return it to the context inference engine 136 in the wireless device 100 for completion of the an inferred current context result. Alternately, the context inference engine 142 in the network server 140 can complete the required processing and then return the resultant inferred current context to the wireless device 100.

FIG. 2 shows the architecture of a wireless device with support for context awareness. The context awareness is built on top of sensory information received from various types of sensors physically located in the handset shown in FIG. 1. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The sensors can also be located in accessory-like phone covers or in a wireless accessory such as a Bluetooth enabled device. The sensors may also be located in the environment such as in the user's rooms or vehicles. Also the time duration of use of a phone and other available information can be used along with sensor data in context awareness services.

FIG. 2 shows sensor data received from the sensors 122, 124, 125, 126, 128, 132, and 134 is processed by Context Inference Engine 136. The application programs A, B, X, or Y running in the wireless device 100, may optionally provide application data to the context inference engine 136, along with their request for current context. The context inference engine 136 can optionally process the sensor signals and the application data to produce the current context. The context inference engine 136 then feeds the current context through various APIs 154, 156, 158, and 162 to application programs A, B, X, and Y. The application programs may register themselves at the Application Programming Interface 154 to receive current context or changes in the context. This enables context sensitivity in the application programs.

FIG. 2 shows "native" application programs A and B which are executed in a first software system SS1 of the wireless device 100. The term "Software System" is used here for any environment with execution capability. This first software system may be proprietary or based on a commercially available real-time operating system, such as NOS, ISA, EPOC, JAVA, or WAP. Third party application programs X and are executed within an execution environment. This execution environment may limit the system capabilities available for the application programs, such as access to APIs (fixed, not dynamic behavior).

FIG. 2 shows the mobile user's privacy control feature. The privacy control feature enables the user to designate which application programs are granted access to the context awareness APIs 154 to utilize the current context information produced by the context inference engine 136. All requests or registrations by application programs A, B, X, and Y to have access to the Context Inference Engine 136, must first go through the Privacy Control block 150. Privacy Control block 150 uses the user's security data check stored in the Privacy Profile 152 to grant access rights to the requesting application programs. The user controls the granting of access rights by means of the user's security data input by the user through the user interface. The user's security data includes permissions list 155, Public Key Infrastructure (PKI) certificates 157, PKI trusted authority trust list 159, and flags set by the user for those application programs that have been authenticated by the PKI procedures, data set 161. The user can update the user's security data with the UPDATE PRIVACY FEATURES menu displayed by the wireless device 100 shown in FIGS. 1A and 1B. Access might be granted to an application program based on its digital signature, which is a part of the system applications, or other means known in the art. It is also possible to provide a separate system-wide Privacy User Interface to the privacy control 150, which can be employed by the mobile user to set the privacy policies and to alert the mobile user that an application program is attempting to register to receive the user's private context awareness information. The privacy control 150 and Privacy Profile 152 enable the mobile user to grant, deny, or revoke access, to grant access for a limited time, or to require an application program to always request registration before the user grants access.

In FIG. 2, the Context Inference Engine 136 in the wireless device 100 makes inferences from all the sensor inputs based on where the wireless device is located by the mobile user. For instance the inferred current context of the device 100 may be "IN THE USER'S POCKET", when a certain set of sensors input a specific combination of signals having a specific value range. As an example, the resulting inference of the current context by the Context Interference Engine 136 could be expressed in XML language format as follows:

<Context Inference Engine in Device>
 <device placement>pocket</device placement>
 <User Interface state>sleep mode</User Interface state>
 <device location>in elevator 5 building 1 floor 2</device location>
 <API active actions>meeting starting on floor 3 room 322</API active actions>
</Context Inference Engine in Device>

The Context Inference Engine 136 in the wireless device 100 can perform the context inference process with any of several methods. Different input information from the sensors can be weighted according to their relative value of importance appropriate for each environment condition or situation to be analyzed. Each sensor has it's own weight value. Alternatively, the weight values for each sensor for each environment condition can be learned from training sessions using, for example artificial neural networks (ANNs), self-organizing maps (SOMs), decision trees, fuzzy rule-based systems, or model-based systems such as Hidden Markov Modeling (HMM). Combinations of two or more of the alternate methods can be used, depending on the application.

The Context Inference Engine 136 can continuously adapt its weights through adaptive and continuous learning methods, where the user teaches the wireless device 100 new environment conditions and names them. Hidden Markov Modeling (HMM) can be used, for example, to implement an adaptive and continuous learning method for the Context Inference Engine 136. Alternately, the wireless device 100 can be programmed to spontaneously recognize a changed scene by comparing it with known scenes. The user can teach the wireless device new environmental conditions and name them, using the adaptive and automatic learning capability of neural networks. Adaptive and continuous learning methods are computationally intensive and are appropriate candidates to place on the network server 140, which assists the wireless device 100, as discussed below.

The field of context inference has applied the principles of automated pattern recognition to processing diverse types of sensor inputs. Speech recognition has been applied to processing speech signals and handwriting recognition has been applied to processing hand force and accelerometer signals. In the field of robotics, image recognition has been applied to processing digitized still and motion images, mechanical location recognition has been applied to processing laser and sonar range finder signals, and mechanical motion recognition to has been applied to processing inertial, acceleration, and heading signals. In the field of prosthetic devices, touch recognition has been applied to processing tactile sensor signals. In the field of medicine, automated diagnostic programs recognize various pathologies by processing bioelectric field signals, as well as the more traditional pulse, respiration rate, and body temperature signals. These diverse sensor signal recognition processes have the common feature that an initial training stage is conducted where sampled signals are equated with a statistical model for those signals.

The principles of automated pattern recognition for these diverse sensor inputs are exemplified by the techniques for recognizing speech patterns. A common technique used in speech recognition is Hidden Markov Modeling (HMM). The term "Hidden" refers to the probabilistic and not directly observable events which underlie a speech signal. HMM speech recognition systems typically use realizations of phonemes which are statistical models of phonetic segments having parameters that are estimated from a set of training examples. Models of words are made by chaining or linking appropriate statistical models of phonetic segments. The statistical models serve as standards which are to be matched with the unknown voice signals to be recognized.

Recognition of unknown voice signals requires sampling and digitizing the speaker's spoken phonemes. These digitized phonemes are then processed into metadata. The metadata is then compared with the standard statistical models of phonemes. The most likely matches are then the inferred speech recognition result.

Recognition consists of finding the most likely path through the set of word models for the input speech signal. HMM speech recognition decoding systems first need to be trained through an iterative process. The system must be exposed to training examples or words of a particular speaker's voice. A training word is analyzed to generate a framed sequence of acoustic parameters or statistical models. A valid or "good" recognition occurs when the most likely path through the set of word models for the training word results in recognizing the correct training word.

Some useful references discussing the principles of Hidden Markov Models are: Rabiner, L. R., "A tutorial on hidden Markov models and selected applications in speech recognition", *Proceedings of the IEEE*, volume 77, number 2, 1989, pages 257–286. Rabiner, L. R. and Juang, B. H., "An introduction to hidden Markov models", *IEEE ASSP Magazine*, January 1986, pages 4–15. Fraser, Andrew M. and Dimitriadis, Alexis, "Forecasting Probability Densities by Using Hidden Markov Models with Mixed States", *Time Series Prediction: Forecasting the Future and Understanding the Past*, Addison-Wesley, editor Weigend, Andreas S. and Gershenfeld, Neil A., 1994. Charniak, Eugene, *Statistical Language Learning*, MIT Press, Cambridge, Mass., 1993.

To illustrate how Hidden Markov Modeling (HMM) can be extended beyond speech recognition, an example is given here for touch recognition. In the training stage for touch recognition, tactile sensor signals are input from touching a tactile transducer to a rough texture, such as for example sandpaper. The tactile sensor signals are transformed into a statistical model of the input signal. The statistical model is stored as a standard in a computer memory under the handle "rough_texture". To expand the range of sensor signals that are included in the model for "rough_texture", several training sessions can be conducted, each with a different direction or pressure for touching the sandpaper, resulting in several different samples of the statistical model. The set of samples of the statistical model are stored as a standard under the handle "rough_texture". Other training sessions are conducted with a smooth texture, such as glass. The tactile sensor signals input from touching the tactile transducer to the smooth texture are transformed into a statistical model of the input signal and stored as a standard under the handle "smooth_texture". Later, in the recognition mode, an unknown object is touched by the tactile transducer resulting in a sample tactile sensor signal. Recognition of unknown touch signals requires sampling and digitizing the touch transducer's signals. These digitized sensor signals are then processed into metadata. The metadata is then compared with the standard statistical models of "rough_texture" and "smooth_texture". The most likely match is then the inferred touch recognition result.

Combinations of two or more types of sensors can have their signals combined into an input metadata vector that characterizes a composite sampling event. The composite sampling event can be recognized using the principles of Hidden Markov Modeling (HMM). An example composite sampling event can be the state of the health and fatigue of the user of a wireless device 100. For example, a wireless device 100 can be equipped with a tactile transducer which outputs tactile sensor signals in response to the hand force and pulse rate of the user who is gripping the wireless device 100. The wireless device 100 can be equipped with a temperature sensor which outputs body temperature signals in response to the user gripping the wireless device 100. Hidden Markov Modeling (HMM) can be used to recognize a force/temperature input metadata vector that characterizes the combination of the hand force and the temperature sensor signals resulting from a sampling event. A composite sampling event in this example can have an extended duration so that the force sensor can transduce the pulse rate of the user over a period of time.

In the training stage, the tactile sensor signals and the force sensor signals are output while the user is in a condition of good health and resting normally. The tactile sensor signals and the force sensor signals are combined into a force/temperature input metadata vector which is transformed into a statistical model of the input signals. The statistical model is stored as a standard in the computer memory of the wireless device 100 under the handle "good_health_resting_normally". Other training sessions are conducted with the user in different states of health and fatigue. For example, the user may be training the wireless device 100 while working late at night at the office. The tactile sensor signals and the force sensor signals resulting from holding the wireless device 100, are combined into a force/temperature input metadata vector for the user in the condition of being in good health but fatigued. The force/temperature input metadata vector is transformed into a statistical model of the input signals and stored as a standard under the handle "good_health_fatigued".

Later, in the recognition mode, as the user holds the wireless device 100, the tactile sensor signals and the force sensor signals are sampled. The Health/Fatigue_State recognition consists of sampling and digitizing the touch transducer's signals. These digitized sensor signals are then processed into a metadata vector. The metadata vector is then compared with the standard statistical models of handle "good_health_resting_normally" and "good_health_fatigued". The most likely match is then the inferred touch recognition result.

In accordance with the invention, this recognition result can be used by a health maintenance application program in the wireless device 100, to provide useful and appropriate information to the user. For example, a health maintenance program can process the recognition result, and in response, signal an alarm to the user and provide suggestions for medications to palliate the sensed fatigue. One problem with automatic recognition programs is that they are either relatively large or they call databases that are relatively large in comparison to the memory capacity of the wireless device 100.

Another aspect of the invention is the recognition result can be used by a supplementary application program in a remote server, to provide additional and more detailed useful and appropriate information to the user. For example, the server can access a large database of suggestions for medications to palliate the sensed fatigue of the user. The results of the search of the database can be returned to the wireless device 100. The server can also maintain a personal profile of the user's characteristics and preferences and it can use that profile in automatically formulate its query to the database. For example, the user's drug allergies can be stored in the server's database, to insure that recommendations are not made that will result in an allergic reaction by the user to the suggested medication.

FIG. 2A is a functional block diagram of the wireless device 100, the server 140, and the web server 160, and their interaction when exchanging the metadata vector 138 and the privacy control data 150'. These exchanges are bulk encrypted with a symmetric session key, such as a Data Encryption Standard (DES) key, to protect the privacy of the data. To insure the integrity of the metadata vector 138 and the privacy control data 150', a message authentication code (MAC) can be computed and appended to the data, as described in the above referenced book by Stephen Thomas entitled "SSL and TLS", published by John Wiley and Sons, 2000. To insure that the source of the metadata vector 138 and the privacy control data 150' cannot be repudiated, a digital signature can be appended to the data, as described in the above referenced book by Richard E. Smith entitled "Internet Cryptography", published by Addison Wesley, 1997.

FIG. 2A shows the scope of the distributed context awareness implementation. The wireless device 100 has context sensitive applications A, B, X, and Y either downloaded or in firmware. The wireless device 100 may locally preprocess part of the context information in the metadata vector 138 before sending it to the context inference engine 142 in the network server 140 which is capable of processing the data and responding back with the resulting current context. The wireless device 100 may run application programs that require accessing the web service server 160 to provide context sensitive services to the mobile user.

FIG. 2A shows how processing of sensor data from the sensors in the wireless device 100, can be distributed between the wireless device and the network server 140. The operation in FIG. 2A is as follows:

1. The sensors continuously provide the sensor data to the Context Inference Engine 136 in the wireless device 100.

2. An application program that utilizes the context awareness APIs 154 may request the latest context information, or the application program may be registered to receive any changes to specific context information.

3. The Context Inference Engine 136 securely contacts the Context Inference Engine 142 of the network server 140 and sends the metadata vector 138 to the server 140. Depending on the sensors and the implementation details, Context Inference Engine 136 may preprocess part of the sensor data in the metadata vector 138 prior to sending it. Depending on the sensors and the interval for processing, there may be virtual connection open between Context Inference Engine 136 and Context Inference Engine 142 for frequent data exchanges. Context Inference Engine 142 at the network server 140, has the processing power and memory capacity to handle computationally intensive and/or memory intensive processing of the preprocessed sensor data in the metadata vector 138 to produce the current context result information.

4. Context Inference Engine 142 at the network server 140 may utilize local user information (history information, customer details) stored in the user database 146 for making a more accurate determination of the mobile user's current context.

5. Context Inference Engine 142 at the network server 140 then securely returns the current context awareness information to Context Inference Engine 136 in the wireless device 100.

6. Context Inference Engine 136 in the wireless device 100 then provides the current context awareness information through Context Awareness APIs 154 to the application programs registered for to receive that information.

FIG. 2A shows how Web Services in Web Service Server 160 are enabled to receive current context results of the wireless device 100. Web Services Server 160 has a software system for server application program A and an execution environment for server application programs X and Y that are similar to the software system SS1 and execution environment (Exec. Env.) in the wireless device 100 shown in FIG. 2. Server Application programs A, X, and Y in Web Service Server 160 may require access through the Context Awareness APIs to provide Web Services with the current context of the wireless device 100.

In FIG. 2A, Web Service Server 160 uses the Context Inference Client 176 to contact the Context Inference Server 174 in the network server 140. Context Inference Client 176 may utilize customer database information in database 184 to enhance the context sensitivity capabilities of the web server 160. The contact to the network server 140 is done through a context awareness interface 186 to the Context Inference Server 174 in the network server 140.

Context Inference Server 174 registers the Web Services of the web server 160 through the privacy control 164 of the network server 140 to the Context Inference Engine 142. Privacy control 164 has a cached copy 144 of the Privacy Profile 152 of the wireless device 100. This enables processing of the privacy check in the network Server 140 for access requests from web server 160. The communication between web server 160 and network server 140 is secured using the Internet secure protocols such as HTTPS or SSL. The Context Inference Server 174 can publish its own service as a Web Service to other Web Services on the Internet, in which case the implementation of the interface 186 between web server 160 and network server 140 can be Extensible Markup Language (XML) messages carried in the Simple Object Access Protocol (SOAP) messaging protocol.

The Context inference Engine 142 in the network server 140 will receive processed sensor metadata vector 138 information and possibly some application API information originated from the Context Inference Engine 136 of the wireless device 100. The Context inference Engine 142 of the network server has user database 146 information of the behavior of the user and of the past usage of the wireless device. The Context inference Engine 142 of the network server may also have third party services available (such as instances offering content and/or services) to be offered to potential users. What is offered to the user can also depend on the user profile 144. The nature of the Context inference Engine 136 information of the wireless device 100 that is conveyed to the Context inference Engine 142 of the network can be controlled with the privacy control 150 that is managed by the user of the wireless device 100. The user may thus fully or partly disable the Context inference Engine 142 of the network to control the amount of his/her information that can be used by third party services. The privacy control 150 enables the user to control access by anyone to his/her private information.

The Context inference Engine 136 of the wireless device receives an input from the API interface 154 from the applications A, B, X, or Y located in the wireless device 100. An example would be from a calendar application program indicating that a meeting is starting in 25 minutes time. As another example the calendar application program indicates that Lisa is having a birthday tomorrow into which you are participating. The Context inference Engine 136 of the wireless device can convey processed result information to the Context inference Engine 142 of the network server. Now in addition to the sensor information, information from the application programs A, B, X, or Y can also be used in the decision making of the Context inference Engine 136 of the wireless device. A combination of the sensor information and information coming from the application programs A, B, X, or Y can be processed by the Context inference Engine 136. The user's behavior or usage patterns can be detected from the sensor and recorded in a the user database, concerning the usage of the application programs. As previously discussed, the processing of this combined information from the sensors and from the application programs can be shared between the Context inference Engine 136 and the Context inference Engine 142. Either the application programs A, B, X, or Y running in the wireless device 100 or the server application programs A, X and Y running in the web server 160, may optionally provide application data to the context inference engine 142 in the network server 140. The context inference engine 142 can optionally process the metadata vector 138 and the application data to produce the current context.

The information transfer from the Context inference Engine 136 of the wireless device to the Context inference Engine 142 of the network server can be done in alternative ways. The system can be managed so that the current consumption and transfer capacity between the wireless device 100 and the network server 140 is taken into account. The context information does not always have to be collected so frequently that it would have to be periodically transferred to the network side 140 every few seconds. Depending on the application, the timing window applied to information transfer from the Context inference Engine 136 of the wireless device 100 to the Context inference Engine 142 of the server 140 can vary from seconds to minutes. If there were no event change or condition change in the environment of the wireless device 100, there would be no need to transfer information to the Context inference Engine 142 of the server 140. Additionally information can be temporarily stored in a buffer in the wireless device 100, which can then transferred less frequently to the network Context inference Engine 142. Packet based GPRS and UMTS can support the less frequent information transfer rates. Also, it is advantageous to send the network Context inference Engine 142 information from the wireless device 100 as an attachment, immediately subsequent to other signaling made to in the network direction from the wireless device 100, thus saving the radio transmitter of the wireless device 100 from having to be switched on again for transferring the Context inference Engine 136 information separately to the network server 140.

Returning to FIG. 1, the relationship is shown between the network server 140, the Universal Description, Discovery and Integration (UDDI) registry 170, and a plurality of web site servers 160. UDDI is a defacto standard for an Internet-based registry. The UDDI registry 170 enables the network server 140 to discover new web sites for services and businesses on the Internet. Once such services and businesses are identified by the UDDI registry 170 to the network server 140, then the server 140 must apply the mobile user's cached privacy profile 144 in FIG. 2A, in order to prevent unauthorized access of the user's private data by application programs on the newly discovered web sites.

Figure 3:
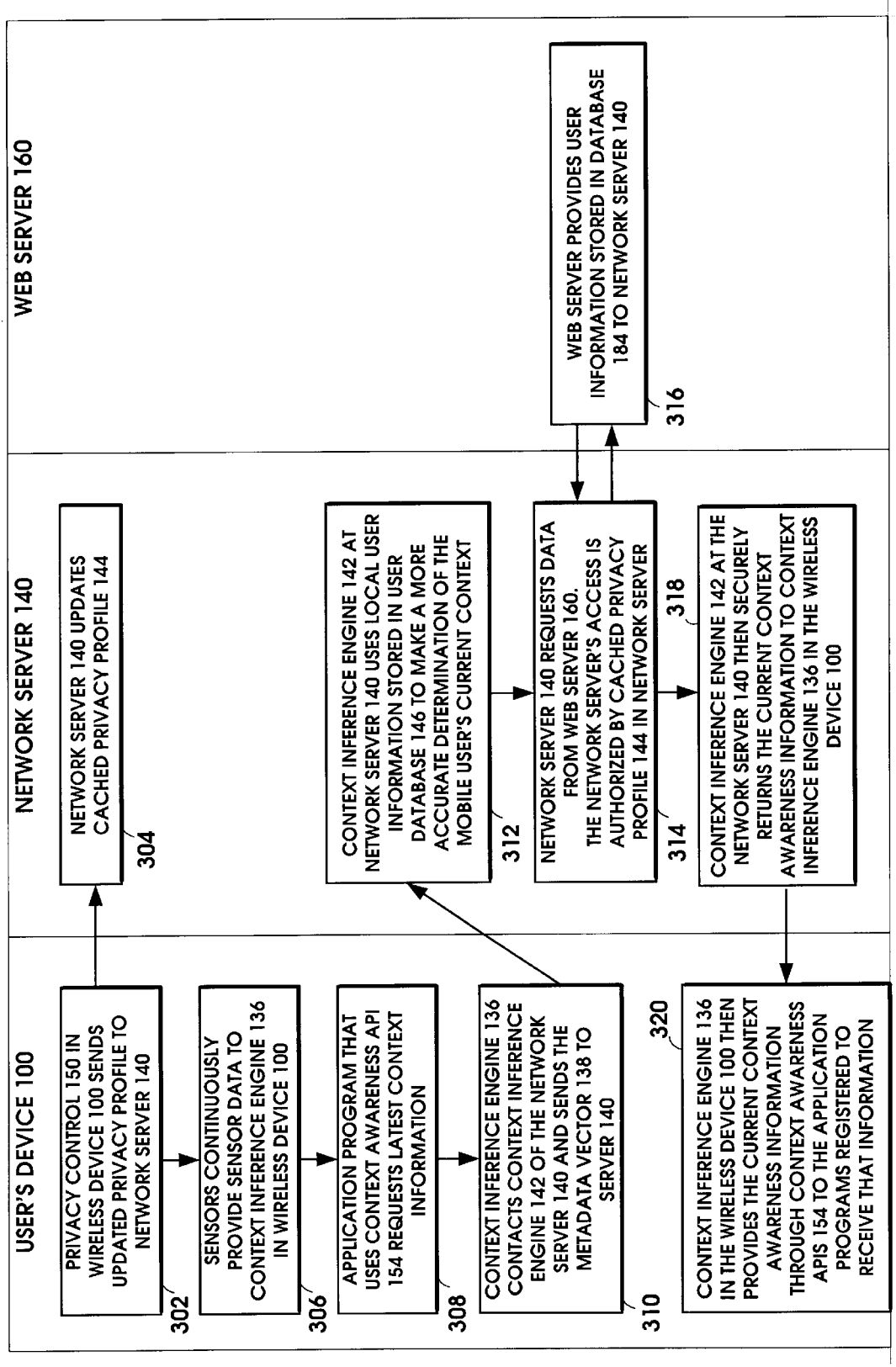
FIG. 3 is a network process flow diagram of the interaction of the wireless device 100, network server 140, and web server 160 when carrying out the determination of the current context of the wireless device 100.

FIG. 3 is a network process flow diagram of the interaction of the wireless device 100 I the first column, network server 140 in the middle column, and web server 160 in the right column, when they carry out the determination of the current context of the wireless device 100. The process begins with the wireless device 100 in step 302:

Step 302: PRIVACY CONTROL 150 IN WIRELESS DEVICE 100 SENDS UPDATED PRIVACY PROFILE TO NETWORK SERVER 140.

Then the network server 140 continues with step 304:

Step 304: NETWORK SERVER 140 UPDATES CACHED PRIVACY PROFILE 144.

The wireless device 100 continues with the following steps 306, 308, and 310:

Step 306: SENSORS CONTINUOUSLY PROVIDE SENSOR DATA TO CONTEXT INFERENCE ENGINE 136 IN WIRELESS DEVICE 100.

Step 308: APPLICATION PROGRAM THAT USES CONTEXT AWARENESS API 154 REQUESTS LATEST CONTEXT INFORMATION.

Step 310: CONTEXT INFERENCE ENGINE 136 CONTACTS CONTEXT INFERENCE ENGINE 142 OF THE NETWORK SERVER 140 AND SENDS THE METADATA VECTOR 138 TO SERVER 140.

Then the network server 140 continues with steps 312 and 314:

Step 312: CONTEXT INFERENCE ENGINE 142 AT NETWORK SERVER 140 USES LOCAL USER INFORMATION STORED IN USER DATABASE 146 TO MAKE A MORE ACCURATE DETERMINATION OF THE MOBILE USER'S CURRENT CONTEXT.

Step 314: NETWORK SERVER 140 REQUESTS DATA FROM WEB SERVER 160. THE NETWORK SERVER'S ACCESS IS AUTHORIZED BY CACHED PRIVACY PROFILE 144 IN NETWORK SERVER.

Then the web server 160 continues with step 316:

Step 316: WEB SERVER PROVIDES USER INFORMATION STORED IN DATABASE 184 TO NETWORK SERVER 140.

Then the network server 140 continues with step 318:

Step 318: CONTEXT INFERENCE ENGINE 142 AT THE NETWORK SERVER 140 THEN SECURELY

RETURNS THE CURRENT CONTEXT AWARENESS INFORMATION TO CONTEXT INFERENCE ENGINE 136 IN THE WIRELESS DEVICE 100.

Then the wireless device 100 finishes with step 320:

Step 318: CONTEXT INFERENCE ENGINE 136 IN THE WIRELESS DEVICE 100 THEN PROVIDES THE CURRENT CONTEXT AWARENESS INFORMATION THROUGH CONTEXT AWARENESS APIs 154 TO THE APPLICATION PROGRAMS REGISTERED TO RECEIVE THAT INFORMATION.

FIG. 4 is a functional block diagram of the network server 140, showing the memory 402 storing the application services software programs needed to perform the operations of the invention. The memory is connected by the bus 404 to the cache 144, user database 146, TCP/IP network adapter 406, and central processor 410. The memory 402 stores programs which are sequences of executable instructions which, when executed by the processor 410, carry out the methods of the invention.

FIG. 4 is a functional block diagram of the network server, showing the memory storing the application services software programs needed to perform the operations of an embodiment of the invention. FIG. 4 discloses the functional components of an exemplary network server 140 arranged as an object model. The object model groups the object oriented software programs into components that perform the major functions and applications in network server 140. The object model for memory 402 of network server 140 employs a three-tier architecture that includes presentation tier 415, infrastructure objects partition 422, and business logic tier 414. The object model further divides business logic tier 414 into two partitions, application objects partition 422 and data objects partition 426.

Presentation tier 415 retains the programs that manage the device interfaces to network server 140. In FIG. 4, presentation tier 415 includes network interface 420. A suitable implementation of presentation tier 415 may use Java servlets to interact with WAP protocol gateway 120 via the hypertext transfer protocol ("HTTP"). The Java servlets ran within a request/response server that manages the exchange of messages between WAP protocol gateway 120 and network server 140. A Java servlet is a Java program that runs within a Web server environment. A Java servlet takes a request as input, parses the data, performs logic operations, and issues a response back to WAP protocol gateway 120. The Java runtime platform pools the Java servlets to simultaneously service many requests. Network interface 420 accepts request messages from WAP protocol gateway 120 and passes the information in the request to visit object 428 for further processing. Visit object 428 passes the result of that processing to network interface 420 for transmission back to the WAP protocol gateway 120. Network interface 420 may also use network adapter 406 to exchange data with another user device.

Infrastructure objects partition 422 retains the programs that perform administrative and system functions on behalf of business logic tier 414. Infrastructure objects partition 422 includes operating system 425, and an object oriented software program component for database server interface 430, and system administrator interface 432.

Business logic tier 414 in FIG. 4 includes multiple instances of visit object 428, 428', 428". A separate instance of visit object 428 exists for each network interface 420 session. Each visit object 428 is a stateful session object that includes a persistent storage area from initiation through termination of the session, not just during a single interaction or method call. The persistent storage area retains information associated with the session.

When WAP protocol gateway 120 sends a metadata vector 138 message to network server 140, the message is sent to network interface 420 to invoke a method that creates visit object 428 and stores connection information as a state in visit object 428. Visit object 428 may, in turn, invoke a method in context inference engine 142 application 440 to perform a context inference on the metadata vector and return a current context result.

When WAP protocol gateway 120 sends a privacy control data 150' message to network server 140, the message is sent to network interface 420 to invoke a method that creates visit object 428 and stores connection information as a state in visit object 428. Visit object 428 may, in turn, invoke a method in privacy control 164 application 442 to update the cached privacy profile 144. The application 442, in turn make a method call to privacy profile update application 448 to store the updated data 150' in the cache 144.

When WAP protocol gateway 120 sends a user data update message to network server 140, the message is sent to network interface 420 to invoke a method that creates visit object 428 and stores connection information as a state in visit object 428. Visit object 428 may, in turn, invoke a method in user database application 446 to store the user data in the database 146.

A description of server programming applications developed with Enterprise Java Beans is provided in the book by Ed Roman entitled "Mastering Enterprise Java Beans", published by John Wiley and Sons, 1999. A description of the use of an object model in the design of server applications is provided in the book by Matthew Reynolds entitled "Beginning E-Commerce", Wrox Press Inc, 2000, (ISBN: 1861003986). Java servlets and the development of web site servers is described in the book by Duane K. Fields, et al. entitled "Web Development with Java Server Pages", published by Manning Publications Co., 2000.

The resulting context sensitive web services invention enables a mobile phone or wireless device 100 to use context inference techniques to sense the user's environment and in response, to provide useful information to the user that is appropriate to the user's perceived environment. The mobile user is provided with the ability to control access by application programs anywhere in the network, to the user's private data.

Although a specific embodiment of the invention has been disclosed, it will be understood by those having skill in the art that changes can be made to the specific embodiment without departing from the spirit and the scope of the invention.

What is claimed is:

1. A method to enable a wireless device to provide information to its user that is related to the device's current environment, comprising:

receiving sensor signals characterizing a current environment of the wireless device, including first environmental signals and second environmental signals;

combining the first environmental signals and the second environmental signals into composite sensor signals;

processing the composite sensor signals with a context inference engine in the wireless device;

outputting a current context result from the processing by the context inference engine;

appending to an application program, an authorization to access the current context result information to the user in response to the current context result;

automatically granting access permission to the application program to access the current context result, in response to the authorization providing the current context result to the application program in response to the authorization; and receiving the information from the application program.

2. The method of claim 1, wherein the processing of the sensor signals with a context inference engine is embodied as programmed instructions executed within the user's wireless device.

3. The method of claim 1, which further comprises:
providing user control of access by application programs to the user's private data.

4. The method of claim 1, which further comprises:
providing the authorization to enable access by the application program to the user's private data.

5. The method of claim 1, wherein said providing authorization further comprises:
providing a digital certificate verified by a trusted authority to the application program.

6. The method of claim 5, wherein said granting access permission to the application program further comprises:
receiving a request for the application program to access the user's private data or the current context result; and
automatically checking the digital certificate to verify the application program
automatically granting access permission to the application program, in accordance with the digital certificate.

7. An apparatus to enable a wireless device to provide useful information to its user that is related to the device's current environment, comprising:
a processor;
a memory coupled to the processor, programmed to perform the steps of:
receiving sensor signals characterizing a current environment of the wireless device, including first environmental signals and second environmental signals;
combining the first environmental signals and the second environmental signals into composite sensor signals;
processing the composite sensor signals with a context inference engine in the wireless device;
outputting a current context result from the processing by the context inference engine;
appending to an application program, an authorization to access the current context result;
automatically granting access permission to the application program to access the current context result, in response to the authorization;
providing the current context result to the application program in response to the authorization; and
receiving the information from the application program.

8. The apparatus of claim 7, wherein the processing of the sensor signals with a context inference engine is embodied as programmed instructions executed within the user's wireless device to offload computationally intensive load from the wireless device to the server.

9. The apparatus of claim 7, which further comprises:
a second context inference engine in a separate network server processing the sensor signals in response to signals from the user's wireless device to offload computationally intensive load from the wireless device to the server.

10. The apparatus of claim 9, wherein the server accesses files from a web server, for selective forwarding to the user's wireless device.

11. A wireless device to provide information to its user that is related to the device's current environment, comprising:

a first environmental sensor and a second environmental sensor for providing first environmental signals and second environmental signals characterizing a current environment of the wireless device;

logic to combine the first environmental signals and the second environmental signals into composite sensor signals;

a context inference engine in the wireless device, coupled to the sensors, for processing the composite sensor signals; said context inference engine providing a current context result from the processing;

an output device coupled to the context inference engine for outputting a current context from the processing by the context inference engine;

authorization control for appending to application program, to access the current context results;

said access control automatically granting access permission to the application program to access the current context result, logic for providing the current context result to the application program in response to the authorization; and logic for receiving the information from the application program.

12. A wireless device to provide information to its user that is related to the device's current environment, comprising:
a privacy control for providing the user control of access by an application program including an appended authorization code to the user's private data;
a sensor for providing composite sensor signals characterizing a current environment of the wireless device;
a context inference engine in the wireless device, coupled to the sensor, for processing the sensor signals;
said context inference engine coupled to the privacy control, for providing a current context result from the processing to the application program if authorized by the authorization code appended to the application; and
an output device coupled to the privacy control, for providing information to the user in response to the application program.

13. A system to provide information to the user of a wireless device that is related to the device's current environment, comprising:
a privacy control in a server for receiving a user privacy profile from the wireless device and providing the user control of access security to the user's private data by an application including an appended authorization code;
a privacy control in a server for receiving a user privacy profile from the wireless device and providing the user control of access security to the user's private data by an application program including an appended authorization code
a sensor in the wireless device for providing composite sensor signals characterizing a current environment of the wireless device;
a context inference engine in the server coupled to the wireless device, for processing sensor information derived from the sensor signals;
said context inference engine coupled to the privacy control, for providing a current context result from the processing to the application program if authorized by the authorization code appended to the application; and an output device in the server, coupled to the privacy control, for transmitting information to the wireless device in response to the application program.

14. A method to enable a wireless device to provide information to its user that is related to the device's current environment, comprising:

running a program in the wireless device that provides application data to the wireless device;

receiving sensor signals characterizing a current environment of the wireless device, including first environmental signals and second environmental signals;

combining the first environmental signals and the second environmental signals into composite sensor signals;

processing the composite sensor signals and the application data with a context inference engine in the wireless device;

outputting a current context result from the processing by the context inference engine;

appending to an application program, an authorization to access the current context result;

automatically granting access permission to the application program to access the current context result, in response to the authorization;

providing the current context result to the application program in response to the authorization; and receiving the information from the application program.

15. The method of claim 14, wherein the processing of the sensor signals with a context inference engine is embodied as programmed instructions executed within the user's wireless device.

16. The method of claim 15, wherein the step of running a program occurs in the wireless device.

17. The method of claim 14, which further comprises:

processing of the composite sensor signals with a second context inference engine embodied as programmed instructions executed within a separate network server in response to signals from the user's wireless device to offload computational intensive load from the wireless device to the server.

18. The method of claim 17, wherein the step of running a program occurs in a web server coupled to the network server.

19. A system to enable a wireless device to provide information to its user that is related to the device's current environment, comprising:

a processor;

a memory coupled to the processor, programmed to perform the steps of:

running a program that provides application data to the wireless device;

receiving sensor signals characterizing a current environment of the wireless device, including first environmental signals and second environmental signals;

combining the first environmental signals and the second environmental signals into composite sensor signals;

processing the composite sensor signals and the application data with a context inference engine in the wireless device;

outputting a current context result from the processing by the context inference engine;

appending information to an application program, an authorization to access the current context result;

automatically granting access permission to the application program to access the current context result, in response to the authorization providing the current context result to the application program in response to the authorization; and receiving the information from the application program.

20. The system of claim 19, wherein the processing of the sensor signals and the application data with a context inference engine is embodied as programmed instructions executed within the user's wireless device.

21. The system of claim 20, wherein the step of running a program occurs in the wireless device.

22. The system of claim 19, which further comprises:

a second context inference engine embodied as programmed instructions executed within a separate network server, for processing the sensor signals and the application data in response to signals from the user's wireless device to offload computationally intensive load from the wireless device to the server.

23. The system of claim 22, wherein the step of running a program occurs in a web server coupled to the network server.

24. A method to enable a wireless device to provide information to its user that is related to the device's current environment, comprising:

receiving sensor signals characterizing a current environment of the wireless device including first environmental signals and second environmental signals;

combining the first environmental signals and the second environmental signals into composite sensor signals;

partially processing the composite sensor signals with a first context inference engine within the user's wireless device;

sending the partially processed sensor signals to a second context inference engine within a separate network server device to offload some of the computationally intensive load from the wireless device to the server;

completing the processing the sensor signals with the second context inference engine;

sending a current context result from the second context inference engine to the wireless device;

appending information to an application program, an authorization to access the current context result;

automatically granting access permission to the application program to access the_current context result, in response to the authorization;

providing the current context result to the application program in response to the authorization; and receiving the information from the application program.

25. A system to enable a wireless device to provide information to its user that is related to the device's current environment, comprising:

a wireless device for receiving sensor signals characterizing a current environment of the wireless device including first environmental signals and second environmental signals;

logic for combining the first environmental signals and the second environmental signals into composite sensor signals;

a first context inference engine within the user's wireless device for partially processing the composite sensor signals;

a second context inference engine within a separate network server for receiving the partially processed sensor signals sent from the wireless device to offload some of the computationally intensive load from the wireless device to the server and completing the processing the sensor signals;

said second context inference engine sending a current context result from the second context inference engine to the wireless device;

authorization control for providing to an application program, an authorization to access the current context result;

access control for automatically granting access permission to the application program to access the current context result, in response to the authorization;

logic for providing the current context result to the application program in response to the authorization; and logic for receiving the information from the application program.

26. A method to enable a wireless device to provide information to its user that is related to the device's current environment, comprising:

receiving sensor signals characterizing a current environment of the wireless device including first environmental signals and second environmental signals;

combining the first environmental signals and the second environmental signals into composite sensor signals;

partially processing the composite sensor signals with a first context inference engine within the user's wireless device;

sending the partially processed sensor signals to a second context inference engine within a separate network server to offload some of the commutationally intensive load from the wireless device to the server;

completing the processing the sensor signals with the second context inference engine;

forwarding a current context result from the network server to a second server;

sending information from the second server to the user's wireless device in response to the current context result;

appending to an application program, an authorization to access the current context result;

automatically granting access permission to the application program to access the current context result, in response to the authorization;

providing the current context result to the application program in response to the authorization; and receiving the information from the application program.

27. A method to enable a wireless device to provide information to its user that is related to the device's current environment, comprising:

receiving sensor signals characterizing a current environment of the wireless device including first environmental signals and second environmental signals;

combining the first environmental signals and the second environmental signals into composite sensor signals;

processing the composite sensor signals with a context inference engine in the wireless device;

outputting a current context result from the processing by the context inference engine;

providing user control of access by an application program to the current context result if authorized by an authorization code appended to the application;

providing the current context result to the application program in response to the user control; and receiving the information from the application program in response to the current context result.

28. A method to enable a wireless device to provide information to its user that is related to the device's current environment, comprising:

receiving sensor signals characterizing a current environment of the wireless device including first environmental signals and second environmental signals;

combining the first environmental signals and the second environmental signals into composite sensor signals;

processing of the composite sensor signals with a context inference engine embodied as programmed instructions executed within a separate network server in response to signals from the user's wireless devices;

outputting a current context result from the processing by the context inference engine;

providing user control of access by an application program to the current context result, if authorized by an authorization code appended to the application;

wherein said user control is embodied as programmed instructions executed within the separate network server in response to signals from the user's wireless device;

providing the current context result to the application program in response to the user control; and receiving the information from the application program.

29. The method of claim 28, wherein a personal profile of the user is maintained by the server.

30. The method of claim 29, which further comprises:

providing user control of access by application programs to the user's personal profile.

31. The method of claim 30, which further comprises:

enabling context sensitive applications and services within the network server while providing to the user control over the privacy of the user's current context result.

32. A computer program product to enable a wireless device to provide information to its user that is related to the device's current environment, comprising:

a computer readable medium;

program code in said computer readable medium for receiving sensor signals characterizing a current environment of the wireless device including first environmental signals and second environmental signals;

program code in said computer readable medium for combining the first environmental signals and the second environmental signals into composite sensor signals;

program code in said computer readable medium for processing the composite sensor signals with a context inference engine in said wireless device;

program code in said computer readable medium for outputting a current context result from the processing by the context inference engine; and program code in said computer readable medium for appending to an application program, an authorization to access the current context result;

program code in said computer readable medium for automatically granting access permission to the application program to access the current context result, in response to the authorization;

program code in said computer readable medium for providing the current context result to the application program in response to the authorization; and program code in said computer readable medium for receiving the information from the application program.

33. A method to enable a wireless device to provide information to its user that is related to the device's current environment, comprising:

receiving sensor signals characterizing a current environment of the wireless device having a limited processing power and storage capacity;

context inference processing the sensor signals, said context inference processing being characterized by a computationally intensive load and a storage requirement;

said context inference processing being partially performed by a first context inference engine within the user's wireless device, producing partially processed sensor signals;

sending the partially processed sensor signals to a second context inference engine within a separate server, to offload some of the computationally intensive load from the wireless device to the server;

said context inference processing being completed with the second context inference engine, producing a current context result; and providing information to the user in response to the current context result.

34. The method of claim 33, which further comprises:
providing user control of access by application programs in a web server, to the user's private data.

35. The method of claim 33, which further comprises:
providing the current context result to an application program; and receiving the information for the user from the application program.

36. The method of claim 33, which further comprises:
providing user control of access by an application program to the current context result;
providing the current context result to the application program in response to the user control; and
receiving the useful information from the application program.

37. The method of claim 36, which further comprises:
granting access permission to the application program to access the current context result, based on the user's data stored in a privacy profile.

38. The method of claim 36, wherein providing user control of access is embodied as programmed instructions executed within a separate network server in response to signals from the user's wireless device.

39. The method of claim 38, wherein the server accesses files from a web server, for selective forwarding to the user's wireless device.

40. The method of claim 38, wherein the wireless device offloads a portion of the processing of providing user control of access, to the server.

41. The method of claim 38, wherein a personal profile of the user is maintained by the server.

42. The method of claim 41, which further comprises:
providing user control of access by application programs to the user's personal profile.

43. The method of claim 38, which further comprises:
providing user control of access by application programs to the user's personal profile in the server.

44. The method of claim 36, which further comprises:
providing user control of access by application programs in a web server, to the user's private data.

45. The method of claim 44, which further comprises:
enabling context sensitive applications and services within the wireless device while providing to the user control over the privacy user's current context result.

46. The method of claim 44, which further comprises:
enabling context sensitive applications and services within the network server while providing to the user control over the privacy user's current context result.

47. A method to enable a wireless device to provide information to its user that is related to the device's current environment, comprising:

receiving sensor signals characterizing a current environment of the wireless device, including first environmental signals and second environmental signals;

combining the first environmental signals and the second environmental signals into composite sensor signals;

processing the composite sensor signals with a context inference engine in the wireless device;

processing the composite sensor signals with a second context inference engine embodied as programed instructions executed within a separate network server in response to signals from the user's wireless device to offload some of the computationally intensive load from wireless device to the server;

outputting a current context result from the processing by the first and second context inference engines;

appending to an application program, an authorization to access the current context result information to the user in response to the current context result;

automatically granting access permission to the application program to access the current context result, in response to the authorization;

providing the current context result to the application program in response to the authorization; and receiving the information from the application program.

48. The method of claim 47, wherein the server accesses files from a web server, for selective forwarding to the user's wireless device.

49. The method of claim 47, wherein the wireless device offloads a portion of the processing of the sensor signals with a context inference engine to the server.

50. The method of claim 47, wherein a personal profile of the user is maintained by the server.

51. The method of claim 47, which further comprises:
providing user control of access by application programs to the user's private data in the server.

* * * * *